Jan. 30, 1968  E. C. FRAZE  3,366,086
METHOD OF FABRICATING A SHEET METAL JOINT
Filed June 18, 1965  7 Sheets-Sheet 1

Jan. 30, 1968   E. C. FRAZE   3,366,086
METHOD OF FABRICATING A SHEET METAL JOINT
Filed June 18, 1965   7 Sheets-Sheet 2

INVENTOR:
Ermal C. Fraze

By Smyth, Roston & Pavitt
Attorneys

Jan. 30, 1968  E. C. FRAZE  3,366,086
METHOD OF FABRICATING A SHEET METAL JOINT
Filed June 18, 1965  7 Sheets-Sheet 3

INVENTOR:
Ermal C. Fraze
Attorneys

Jan. 30, 1968 E. C. FRAZE 3,366,086
METHOD OF FABRICATING A SHEET METAL JOINT
Filed June 18, 1965 7 Sheets-Sheet 4
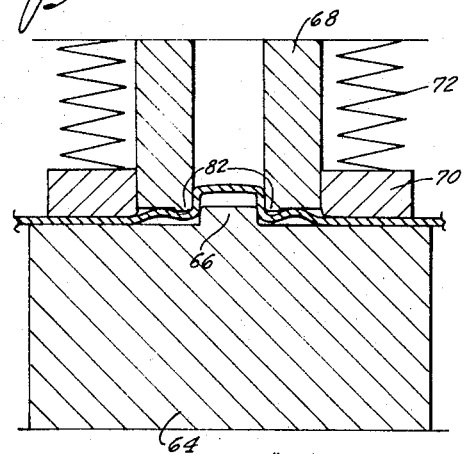
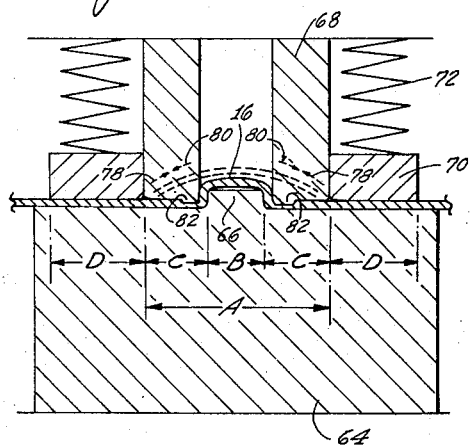
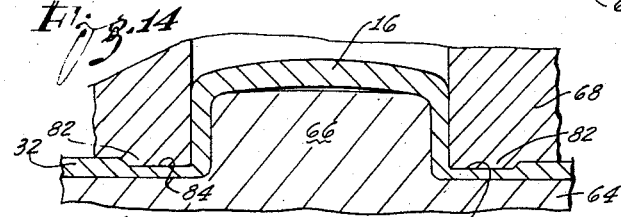
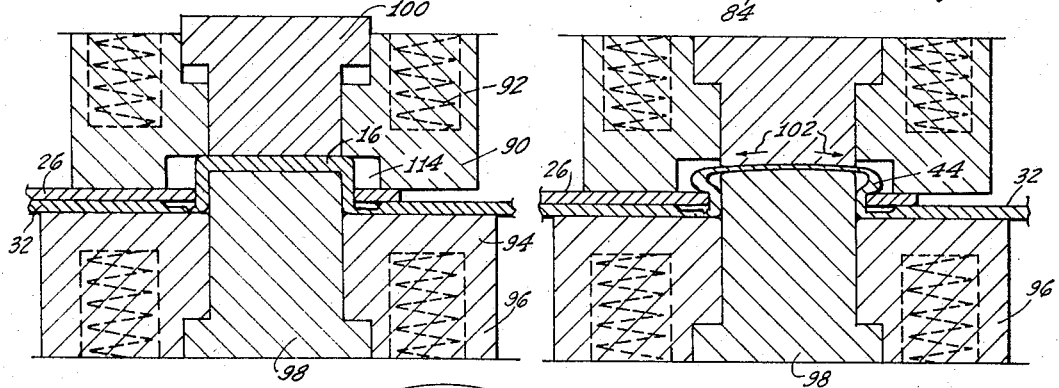
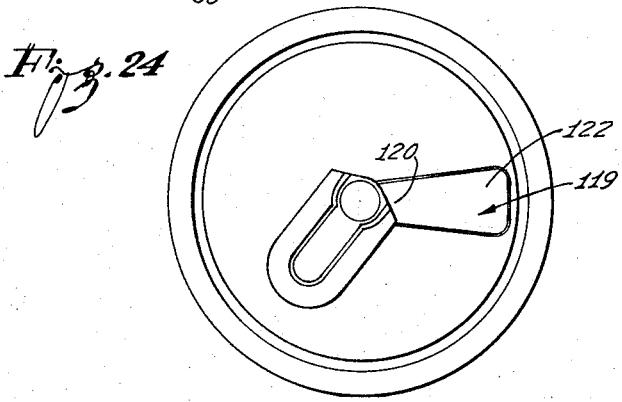
INVENTOR:
Ermal C. Fraze
Attorneys Jan. 30, 1968     E. C. FRAZE     3,366,086
METHOD OF FABRICATING A SHEET METAL JOINT
Filed June 18, 1965     7 Sheets-Sheet 5
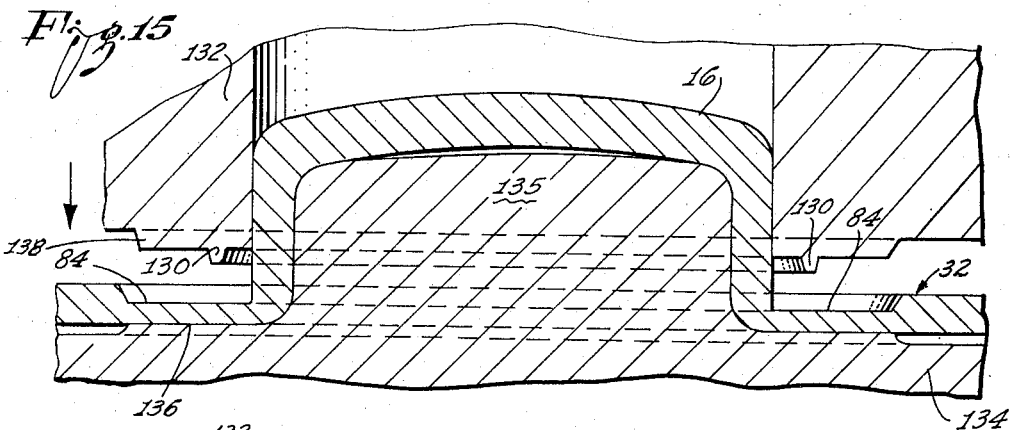
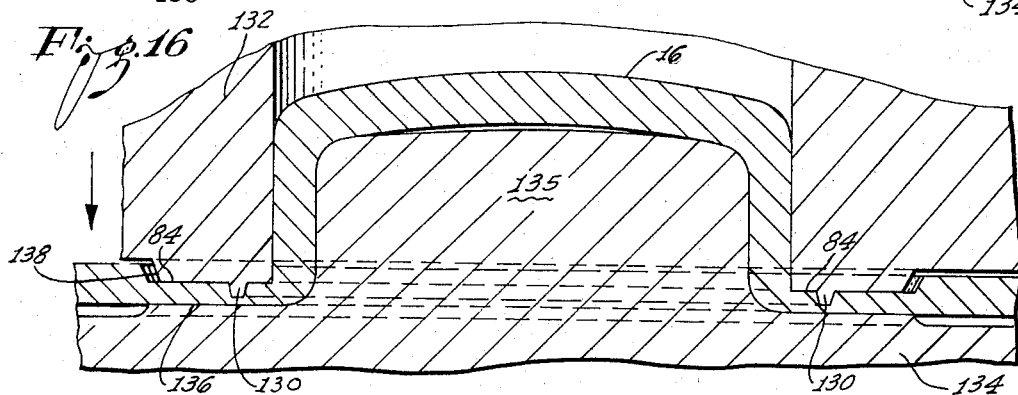
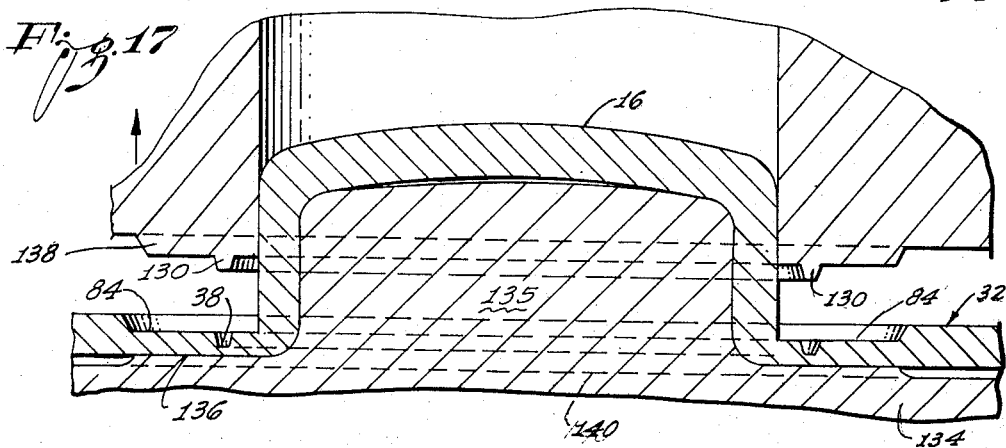
INVENTOR.
Ermal C. Fraze
Attorneys

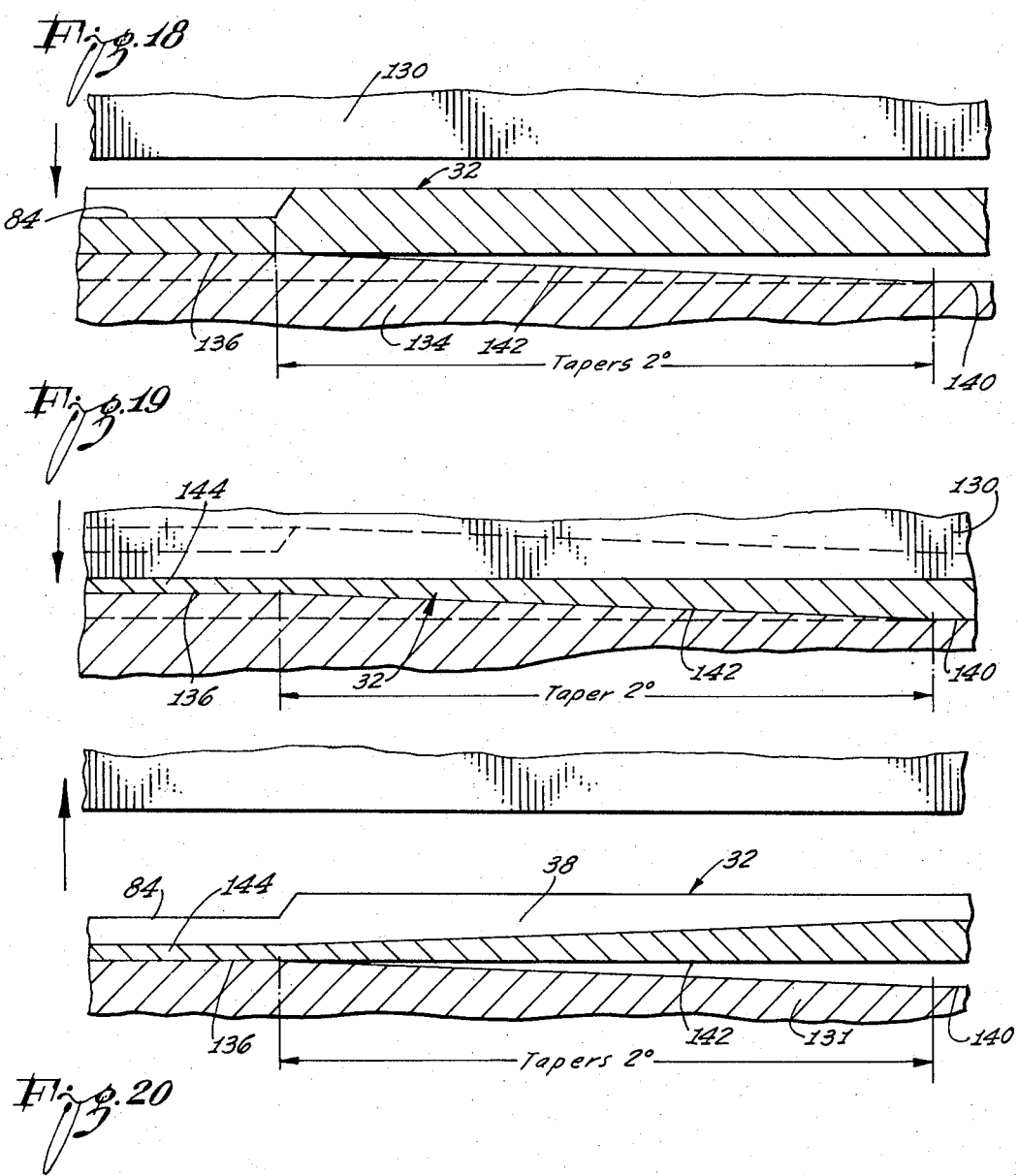

Jan. 30, 1968    E. C. FRAZE    3,366,086
METHOD OF FABRICATING A SHEET METAL JOINT
Filed June 18, 1965    7 Sheets-Sheet 7

INVENTOR.
Ermal C. Fraze
Attorneys

United States Patent Office 3,366,086
Patented Jan. 30, 1968

3,366,086
METHOD OF FABRICATING A SHEET METAL JOINT
Ermal C. Fraze, 355 W. Stroop Road,
Dayton, Ohio 45429
Continuation-in-part of application Ser. No. 130,884, Aug. 11, 1961. This application June 18, 1965, Ser. No. 465,022
25 Claims. (Cl. 113—121)

This application constitutes a continuation-in-part of my application Ser. No. 280,545 filed May 15, 1963, now Patent No. 3,191,564, for a "Method of Fabricating a Sheet Metal Joint," which, in turn, is a continuation-in-part of my application Ser. No. 193,060 filed May 2, 1962, now abandoned, for "Sheet Metal Joint and Method and Means of Fabrication," now abandoned which, in turn, is a continuation-in-part of my application Ser. No. 130,884 filed Aug. 11, 1961, for "Sheet Metal Joint and Method of Fabrication," now abandoned.

This invention relates to a method of forming container tops having tear strips with tabs attached thereto for manual removal of the tear strips to open the containers, as distinguished from the broad method, claimed in application Ser. No. 280,545, of attaching a member or device to a sheet of deformable material.

It is highly desirable to produce sealable cans or containers, for example, cans for fruit juices or like beverages, various food products, articles subject to deterioration by the atmosphere, with the tops or end walls of the cans scored to provide tear strips and with tabs attached to the tear strips to serve as handles for severing the tear strips without the use of can openers or like tools. Unfortunately, however, the problem of attaching the tabs to the tear strips in a reliable manner that is satisfactory for mass production has not been heretofore solved.

The use of a separate rivet or like fastener for securing a tab to the tear strip of a can top has been unsatisfactory for a number of reasons, including the important reason that the use of such a fastener necessitates puncturing the can top or wall with the possibility of subsequent leakage. Spot welding techniques have also been proposed but have not been successful for reasons that have plagued spot weld connections for many years.

Attempts have also been made to attach the tabs to the tear strips by cold pressure welding techniques. While the cold pressure welding process has been successful in carefully controlled applications, it has not proved satisfactory in commercial production of cans for a number of reasons. In the first place, the mating surfaces to be pressure welded together must be carefully cleaned and prepared, for example, by brush elements that abrade the surfaces to be welded, but such cleaning operations are difficult to carry out successfully by mass production equipment. In the second place, the inner surfaces of cans are commonly necessarily coated with a suitable sealant which is inevitably ruptured by the cold pressure welding process.

There also have been attempts in the prior art to connect a tab or thin metal lever to a container top by forming a portion of the container top into a hollow rivet for engagement with the tab or lever through an aperture thereof. In no instance, however, has the hollow rivet proved strong enough to be depended upon to carry out the metal tearing operation.

One cause of the failure of such a prior art hollow rivet is that in the usual fabrication procedure, the total surface area of the finished rivet is so much greater than the area of the container top from which the rivet is formed that the metal of the rivet is greatly stretched and thinned. Consequently, the metal wall of the rivet that must transmit the manual force for the metal tearing operation is of a thickness that is only a fraction of the thickness of the original sheet metal stock from which the container top is fabricated.

A second and equally important cause is that in prior art procedures the hollow sheet metal rivet is subjected to overall axial compression force in the operation of staking or heading the hollow rivet into positive engagement with the handle tab or lever. The axial compression force collapses the thin metal of the peripheral wall of the hollow rivet, the thin metal wall being crimped and folded upon itself with consequent weakening and destruction of the metal structure.

The present invention presents a number of concepts for dealing with these two causes for prior failures. One concept is to eliminate the first cause by utilizing a greater area of the container top to form the hollow rivet and thus increase the ratio between the total area of the hollow rivet and the area of the portion of the container wall that is converted into the hollow rivet configuration. Accordingly, the hollow rivet draws on a given area of the container top that is substantially greater than the area in plan of the finished hollow rivet itself.

In the preferred practice of the invention, a second concept is initially to displace or shift the metal of the container top from an outer area into this given area before utilizing the metal of the given area to form the hollow rivet. The result of applying these two concepts is that the thickness of the metal of the hollow rivet as well as the thickness of the container top immediately around the base of the hollow rivet may be substantially the thickness of the original sheet metal stock, or may be even thicker.

A third concept relates to the second cause of failure, i.e., the weakening of the circumferential or peripheral wall of the rivet by the staking operation. This third concept is that the staking operation may be carried out by radially outward displacement of the metal of the outer end wall of the hollow rivet without subjecting the rivet as a whole to axial compression and without destructive crushing of the peripheral wall of the rivet.

The fourth concept relates to a third cause of failure in carrying out the metal tearing operation, i.e., the force required to initiate the tearing operation which places an additional stress on the rivet. This fourth concept is to displace or shift the metal of the container top immediately around the base of the now formed hollow rivet in two steps so that it is thinner than the original metal stock to facilitate the metal tearing operation adjacent the tabs without loss of the ability of the container top to withstand pressures within the container itself.

Given these new concepts, the problem is presented of how to put the concepts into actual practice. The invention teaches that this problem may be solved by forming the rivet in stages.

The first stage consists of using an area of the container top that is many times the area in plan of the desired rivet to form a gradually sloped boss or dimple of substantially greater area in plane of the desired rivet and of substantially greater height or axial dimension than the desired rivet. In the preferred practice of the invention, this dimple-forming operation is carried out with freedom for the metal outside the circumference of the dimple to creep into the area of the dimple to avoid or at least to minimize the thinning of the metal that forms the dimple. Since the area of the outer annular zone from which the metal is drawn into the area of the dimple varies with the square of the radial dimension of the annular zone and since that radial dimension is relatively large, the sheet metal of the container in the outer annular zone is thinned to only a slight and insignificant degree.

The second stage consists of reforming the oversized dimple into a substantially smaller steep-shouldered boss configuration that is to serve as the desired hollow rivet. The reforming of the dimple consists in partially collapsing the dimple in a manner which may be described as partially folding the metal inwardly in an annular region spaced radially from the center of the dimple. The central portion of the large dimple forms the hollow rivet proper and the remaining outer radial portion of the dimple forms the flat container wall in the radial zone immediately adjacent the base of the hollow rivet. Thus, the large, gradually sloped dimple is converted into a hat-shaped configuration, and while the hat-shaped configuration is of the same area in plan as the dimple, it is substantially smaller in actual area or surface area with the consequence that the conversion causes thickening of the sheet metal.

The surface area of the dimple as distinguished from the projected or plan area is substantially larger than the surface area of the hat-shaped configuration into which the dimple is converted and the conversion of the dimple into the hat-shaped configuration is carried out in such a manner as to crowd the metal toward the central portion of the dimple that forms the transverse end wall of the rivet, the degree of the crowding action differing with different alloys. Consequently, the transverse end wall of the rivet prior to the staking operation tends to be thicker than the thickness of the sheet metal stock from which the can top is fabricated.

As part of this second stage, that is, as the oversized dimple is reformed into a smaller steep-shouldered boss configuration, the area at the base of the boss is thinned, preferably by a die action similar to a coining action, which causes the metal in this area to be extruded into the wall of the rivet to not only thicken the wall, but also to increase the projection of the rivet from the can top. Since this die action thins the can top in an area circumscribing the rivet, it facilitates the tearing operation when the tab is utilized to manually sever the tear strip from the can top.

Thereafter, as part of the second stage, the thinned area is scored to appreciable depth to form a residual web beneath the score line which is strong enough to resist fluid pressure within the container, and yet is thin enough to tear easily when the time comes to remove the tear strip.

The described first and second stages of the process serve the basic purpose of providing a hollow rivet which is characterized by having an adequate volume of metal to permit the hollow rivet to be staked or deformed into a final configuration in which the metal is of optimum distribution for the strength required in the joint.

The final staking step flares the peripheral or cylindrical wall of the rivet into effective overhanging engagement with the rim of the tab aperture through which the rivet extends. To avoid placing the peripheral wall of the rivet under damaging axial compression, the flaring of the outer end portion of the peripheral wall into engagement with the tab is accomplished indirectly instead of directly, i.e., by applying compression forces to the transverse end wall of the rivet without applying the compression force directly to the peripheral wall of the rivet edgewise thereof, the transverse end wall of the rivet being expanded radially by the staking operation to cause corresponding flaring of the portion of the peripheral wall that is immediately adjacent to the transverse end wall of the rivet.

The radial expansion of the outer end of the rivet may be accomplished by subjecting the transverse end wall to compression across its thickness to cause the end wall metal to be extruded radially to the desired expanded configurations. This method has the desired effect of correspondingly flaring the portion of the peripheral wall of the rivet that immediately adjoins the end wall, thereby forming a peripheral bead which overhangs and engages the aperture of the tab that is employed to remove the tear strip.

In summary, the required strength of the joint between the tab and the metal of the tear strip is achieved by a sequence of steps for displacing metal. First, the sheet metal is drawn into a dimple of many times the plan area of the desired rivet to make available a relatively large area of metal for the rivet-forming operation and the thickness of the dimple metal is conserved by drawing metal from the surrounding outlying area into the dimple area at the cost of only slight thinning effect on the metal in the outlying area. Then the dimple configuration is converted into a hat-shaped configuration of lesser surface area in which the crown portion of the hat-shaped configuration is the desired hollow rivet ready for staking into engagement with the tab. At the same time, the metal at the base of the hollow rivet is thinned or indented in a zone around the rivet. Later, the thin metal at the zone is penetrated by a scoring operation which, while further thinning the metal, does not cause the metal to lose its tensile strength, but on the other hand, facilitates the tearing operation.

Three factors are brought into play to build up the rivet in the course of converting the dimple into the hat-shaped configuration. First, the collapsing of the dimple configuration into a hat-shaped configuration of substantially less surface area has a crowding effect edgewise of the metal to thicken the metal. Second, the sheet metal of the dimple is guided or directed radially inwardly during the collapsing operation to favor the rivet portion of the hat-shaped configuration. Third, high magnitude impact pressure is applied in the zone surrounding the rivet portion of the hat-shaped configuration to thin the sheet metal with an extrusion effect which is directed radially inward to build up the rivet portion both in wall thickness and in height.

When the hollow rivet is subsequently staked into engagement with the tab, the direction of metal movement is reversed. The staking operation expands or spreads the metal of the transverse end wall of the hollow rivet radially outwardly to cause the adjoining portion of the peripheral wall to be correspondingly radially expanded or flared into the desired overhanging engagement with the rim of the aperture in the tab. The impact compression across the thickness of the transverse end wall in the preferred practice of the invention adds further strength to the peripheral wall of the rivet.

The end result is a joint construction in which strength is achieved by novel distribution of the sheet metal of the container wall. The advantage of the novel distribution of the metal of the container wall may be appreciated by considering the stresses created in the manual removal of the tear strip. The bead of head flange of the hollow rivet and the metal adjacent the base of the hollow rivet are both highly stressed in shear and the peripheral or circumferential wall of the hollow rivet is highly stressed in tension. In the new distribution, the bead or head flange of the staked rivet is relatively massive for high shear strength and the peripheral wall is at least approximately gauge thickness of the sheet metal stock from which the can top is fabricated instead of being greatly attenuated and the metal adjacent the base of the hollow rivet thinned by coining and scoring to facilitate initiating the severance of the tear strip.

In the preferred practice of the invention both the rivet and the tab are reinforced and in addition the joint between the tab and the tear strip is greatly strengthened by forming the aperture in the tab with a flange to serve as a hub or collar that snugly embraces the hollow rivet in the finished product. In some embodiments of the invention the flange of the tab is turned up and the rim of the flange abuts the bead or "head" of the hollow rivet. A feature of the invention in this respect is that the tooling that is employed to flange the tab is so constructed as to round the inner edge of the flange that abuts the bead of the rivet. With the edge of the flange rounded in this manner there is no tendency for the hub to weaken the hollow rivet by gouging the rivet bead. When the hub is turned upward in this manner, preferably the tab is offset near the base of the flange to provide a tab configuration that nests snugly into the thinned annular zone adjacent the base of the hollow rivet.

In other embodiments of the invention the flange of the tab is turned downward to avoid placing a raw edge of metal in abutment with the bead of the rivet. In such a construction the rim of the flange abuts the coined area adjacent the base of the rivet and preferably the edge of the flange partially overhangs the line of scoring in the coined area.

It has been found that where a tear strip is defined in the usual manner by a groove formed by a scoring tool, the thickness of the sheet being reduced to a thin residual web at the bottom of the groove, the line along which the metal tears when the tear strip is severed is likely to shift in a random manner from one side to the thin residual web to the other. As a consequence, portions of the thin residual web are removed with the tear strip and the remaining portions of the thin residual web are left around the opening in the can top that is formed by the removal of the tear strip. As a result the opening in the can top is left with a sharp and jagged edge.

The present invention teaches that such a jagged edge in the can opening may be avoided by changing the cross-sectional configuration of the scored groove in such manner that the line of least resistance for the tearing action is on the side of the groove that is spaced away from the tear strip. Thus when the tear strip is removed, all of the thin residual web is removed with the tear strip to leave a can opening that has a relatively smooth rim.

A further feature of the invention relates to the fact that when a beverage such as beer is confined in a can that is made largely of tin-coated steel, inevitably iron dissolves into the beverage to a degree that is noticeable and detracts from the flavor of the beverage. It has been discovered that if an exceedingly small area of aluminum is exposed inside such a can, the amount of iron that is dissolved by the beverage is greatly reduced and the flavor is not noticeably impaired. In a can of this type in which the cylindrical body and bottom wall of the can are made of tin-coated steel and the can top is made of aluminum, the aluminum can top is coated on its inner surface with a sealant that is capable of preventing the beverage from making contact with the aluminum. In the present invention, however, the sealant coat is ruptured sufficiently to expose the aluminum to such degree as to prevent deterioration of the flavor of the beverage by an undue amount of iron dissolved into the beverage. For this purpose the scoring operation may be carried out in a manner to disrupt the sealant coat or the forming of the hollow rivet and the forming of a hollow rivet in engagement with the tap may be carried out in a manner to disrupt the sealant coat at the hollow rivet. In the preferred practice of the invention the aluminum metal is exposed both by the scoring operation and by the operation of forming the rivet in engagement with the tab.

The invention may be further understood by reference to the following detailed description and the accompanying drawings.

In the drawings, which are to be regarded as merely illustrative:

FIGURES 10, 11 and 12 are sectional views similar to FIGURES 7 and 8 illustrating successive stages in the conversion of the dimple into the desired hat-shaped configuration;

FIGURE 13 is a similar view at the completion of the conversion of the dimple into the hat-shaped configuration and the completion of the operation of squeezing the sheet metal around the base of the rivet, the rivet proper being the crown portion of the hat-shaped configuration;

FIGURE 14 is an enlarged fragment of FIGURE 13 showing how the cooperating dies squeeze the metal in an annular zone around the base of the rivet for radially inward extrusion of the metal to increase the height of the rivet, the result being shown in plan in FIGURE 3;

Figure 6:
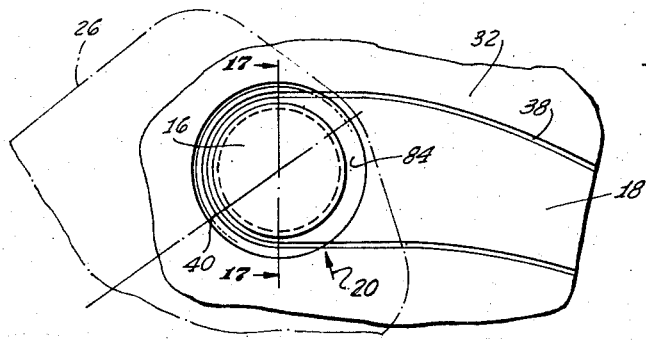
FIGURE 6 is an enlarged fragmentary plan view of the joint structure showing the thinned area around the base of the rivet with the line of scoring extending into the area.
Figure 23:
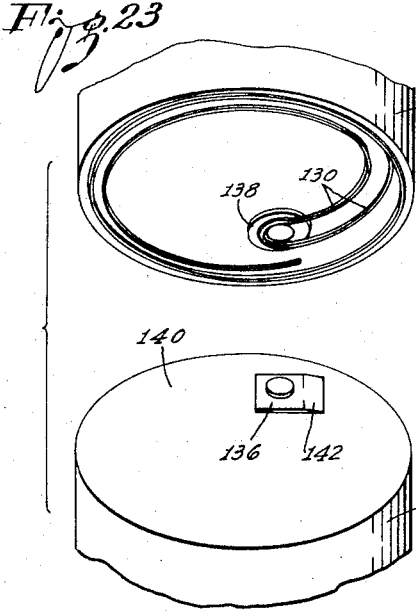
Figure 27:
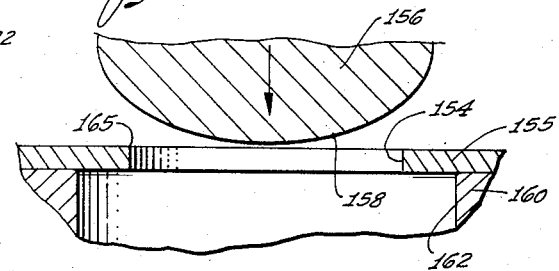
Figure 28:
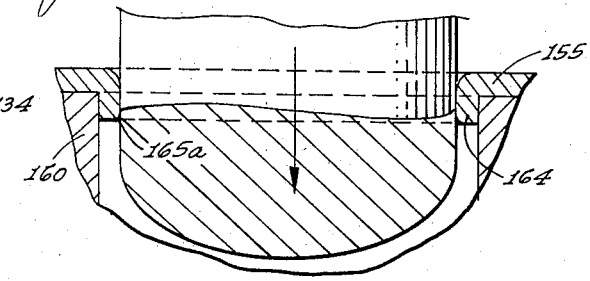
Figure 25:
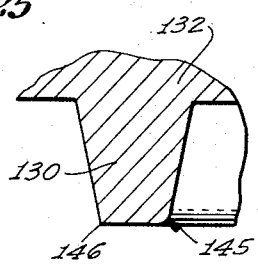
Figure 29:
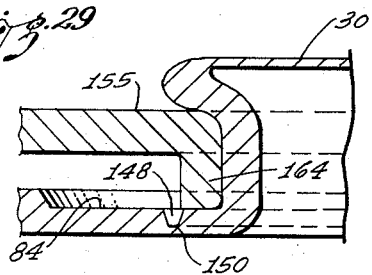
Figure 26:
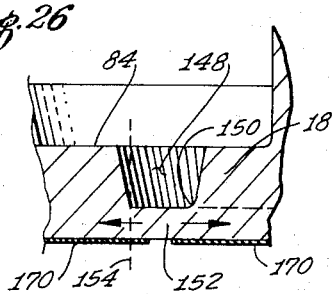
Figure 30:
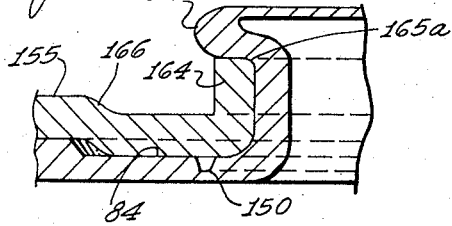

FIGURES 15, 16 and 17 are sectional views taken as indicated by line 17—17 in FIGURE 6, FIGURE 15 showing a scoring die poised in preparation for scoring the sheet material to form a tear strip with a portion of the scoring extending around the rivet in the zone where the metal has been squeezed thin by the dies shown in FIGURE 14, FIGURE 16 showing the scoring die at the stage of maximum penetration of the sheet material, and FIGURE 17 showing the die retracted from the scoring stroke;

FIGURES 18, 19 and 20 are greatly enlarged fragmentary sectional views taken along the scoring line in the region indicated by the arrow 20 in FIGURE 6, FIGURE 18 showing the scoring die poised for operation, FIGURE 19 showing the scoring die at the point of maximum penetration of the sheet material, and FIGURE 20 showing the scoring die retracted after the scoring stroke;

FIGURES 21 and 22 are sectional views showing how dies are employed to stake the hollow rivet into permanent engagement with a sheet metal tab, the staking operation being carried out by squeezing the transverse end wall of the rivet to cause the material thereof to be extruded radially;

FIGURE 23 is a perspective view showing the dies for carrying out of the scoring operation shown in FIGURES 15–17;

FIGURE 24 is a plan view of a can top incorporating another embodiment of the invention;

FIGURE 25 is an enlarged sectional view of a scoring die showing how one longitudinal edge of the scoring element may be rounded in contrast to the sharpness of the other longitudinal edge;

FIGURE 26 is an enlarged cross-sectional view showing the groove produced by the scoring die along the scoring line, the groove having a fillet in its bottom along one side to cause the tearing action to occur along the opposite side;

FIGURES 27 and 28 are enlarged sectional views showing how a pair of dies may be employed to form a flange around an aperture in a tab to provide the tab with a hub dimensioned to embrace a hollow rivet in a tear strip;

FIGURE 29 is an enlarged fragmentary view showing how the hub of a tab embraces a hollow rivet with the hub turned downward; and FIGURE 30 is a similar view with the hub of the tab turned upward.

Figure 1:
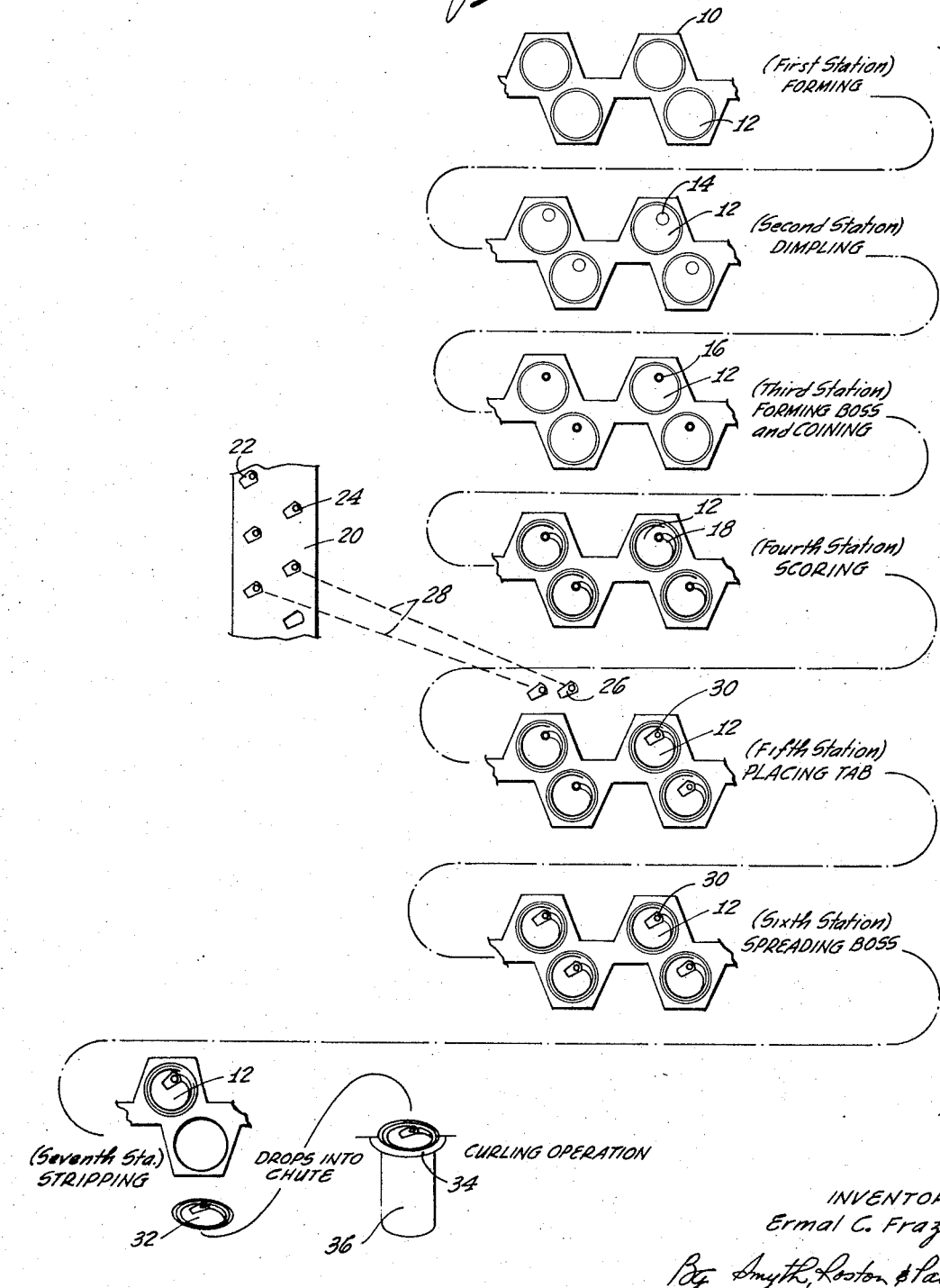
FIGURE 1 is a diagram illustrating the steps in a continuous process for mass production of the can tops.

Referring now to FIGURE 1, it can be seen that there is disclosed one method of fabricating can tops on a mass production basis. At a first station in FIGURE 1, a long sheet 10 of aluminum alloy, cut to the configuration shown and coated with a suitable sealent, is advanced step by step through forming dies which stamp or emboss the can top configurations 12 in the sheet without severing the can top configurations from the sheet. At the next or second station, dies of the character shown in FIGURE 7 form dimples 14 in the can top configurations 12. At the third station, the dimples 14 are converted into hat-shaped configurations to form the hollow rivets 16, the operation being carried out by dies of the character shown in FIGURE 8. Dies at the next or fourth station score the can top configurations 12 to form the tear strips 18.

In the meantime, a strip 20 of a suitable sheet metal is processed in one or more stages to form embossed tab configurations 22 in the sheet. Each tab configuration has an aperture 24 to receive the hollow rivet 16 of the can top 12. At the fifth station in the progress of the sheet 10, the tab configurations 22 are punched out of the strip 20 to provide the desired tabs 26, the tabs being delivered from the cutting dies onto the hollow rivets 16 of the sheet 10 as indicated by the dotted line 28 in FIGURE 16. At the sixth station, the hollow rivets 16 are staked by dies of the character shown in FIGURES 18 and 19 to clamp the tabs 26 firmly in place on the tear strips 18, the stakes rivets being designated 30. At the next station, the can top configurations 12 are punched out of the sheet 10 to produce separate or individual can tops 32. Finally, the can tops 32 are subjected to an edge curling operation by well known means 34 which curls the peripheral edges of the can tops in preparation for attaching the can tops by cylindrical can bodies 36.

Figure 2:
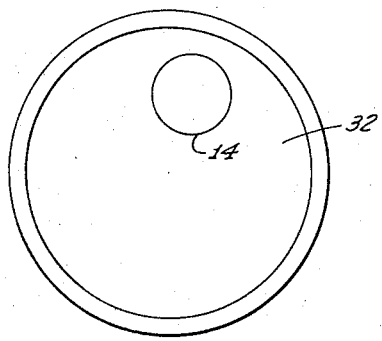
FIGURE 2 is a plan view of the can top after the first operation which consists in forming a sloping boss or dimple in the can top.
Figure 3:
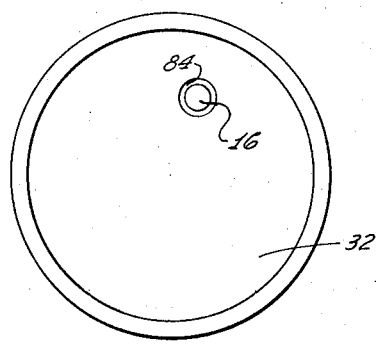
FIGURE 3 is a plan view of a can top after the dimple is converted into a hollow rivet with the metal of the can top locally thinned to form a groove around the base of the rivet.
Figure 4:
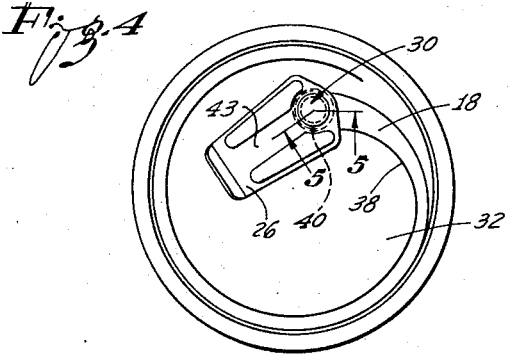
FIGURE 4 is a plan view of a can top with a sheet metal tab attached by the hollow rivet to the tear strip of the can top.

FIGURES 2, 3 and 4 show another method of fabricating can tops on a mass production basis, which method is similar to the method shown in FIGURE 1 except that the dimples 14 and the unstaked hollow rivets 16 are formed on already finished can tops 32. That is to say, the can tops 32 have already been severed from the sheet 10 prior to the forming of either the dimple or the unstaked rivet and the forming of the tear strip 18 thereon. With this latter method, after the formation of the unstaked rivet 16, the can top is scored to form the tear strip 18 whereupon the tab 26, having already been cut from the sheet 20, is positioned on the can top with the hollow rivet 16 projecting through the aperture thereof, and the hollow rivet is converted to a staked rivet 30 to permanently attach the tab 26 to the tear strip, as more clearly shown in FIGURE 4.

It is apparent in considering the disclosure of FIGURES 1 to 4, inclusive, that a unique method of attaching a tab or key to a can top has been provided. Specifically reviewing the illustrated disclosures, it will be noted that the can top is initially formed with a generally conical dimple or bubble-like deformation, after which the dimple or conical deformation is importantly reduced in all its dimensions and reformed into a steep-sided boss or hollow rivet of a height greater than the thickness of the tab, and of a cross-sectional size and shape substantially equal to the size and shape of an aperture formed in the tab.

This arrangement permits the tab to be superimposed on the can top with the hollow rivet extending through the aperture of the tab. At this stage of the practice of the disclosed invention, the hollow rivet has been formed with a transverse wall thereof at least equal in thickness to the wall of the initially formed dimple. With the hollow rivet extending through the aperture of the tab, the transverse end wall of the hollow rivet can be forcibly squeezed to extrude the metal of the end wall radially to form an annular bead or "head" having a wall thickness greater than the now thinned transverse wall, the bead overlying and engaging the rim of the aperture in the tab for firmly attaching the tab to the tear strip. It should be noted that the thickness of the bead wall progressively increases from a point spaced inwardly of the peripheral edge thereof and the progressive thickening continues into the upstanding peripheral wall of the hollow rivet that is engaged with the wall of the aperture of the tab.

More specifically, with reference to FIGURES 4 and 6, it can be seen that there is illustrated a can top, generally designated 32 in FIGURE 1, made of a suitable metal for one end of a can 36 also formed of a suitable metal, with a suitable coating of a sealant on its inner surface. In this instance the can top 32 is made of an aluminum alloy and the rest of the can is made of less expensive tin-coated steel. The can top 32 is scored along a continuous line 38 that forms a tear strip 18 of a spiral-like configuration extending around the circumference of the can top so that removal of the tear strip severs substantially the entire can top from the can. The tear strip 18 has a leading end indicated at 40 and one end of a thin sheet metal tab or lever 26 of suitable metal is attached to the leading end of the tear strip to serve as a handle member for manual removal of the tear strip. The tab 26 is normally engaged with the sheet metal of the can top 32 in face-to-face relation and thus does not interfere with normal stacking of the cans for shipment or display.

In this particular embodiment of the invention, the tab 26 is formed with a pair of reinforcing ribs 42 to provide strength to the handle portion 43 of the tab so that it can act as a lever. In the operation of removing the tear strip 18, the handle portion 43 of the tab 26 serves as a finger piece for lifting the tab to pry loose the leading end of the tear strip and then to sever the tear strip progressively.

Figure 5:
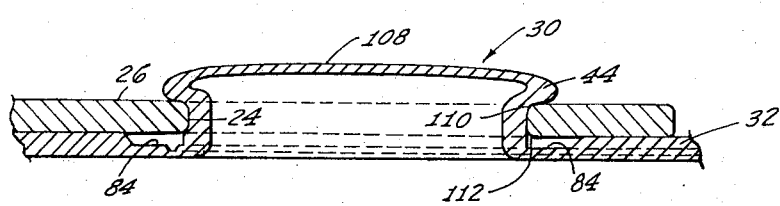
FIGURE 5 is an enlarged sectional view of a finished joint between a can top and tab, the view being taken along the line 5—5 of FIGURE 4.

As best shown in FIGURE 5, tab 26 is formed with an aperture 24 for engagement by a staked hollow rivet 30 that is formed out of the material of the tear strip 18. As may be seen in FIGURE 5, the staked rivet 30 is formed with a hollow bead 44 that snugly engages the rim of the aperture 24 in the tab 26.

As heretofore stated, the hollow rivet 16 is formed in two stages, the first forming stage resulting in a sloping-shouldered boss or a dimple 14 that is shown in plan view in FIGURES 1 and 2. The dimple 14 is formed by die means in the manner shown in FIGURE 7. The size and shape of the dimple for forming a given hollow rivet will depend on the particular metal employed for the can top and the thickness of the material of the can top. A lower male die 50 is formed with a rounded nose 52 and is surrounded by a pressure pad 54 which is acted upon by relatively light pressure springs 56. An upper female die 58 is of an inside diameter to receive the lower die 50 with appropriate clearance for the sheet material that is being formed.

In the initial stage of forming the dimple 14, the pressure pad 54 holds the metal forming of the can top 32 above the plane of the nose 52 of the lower male die 50 and then the dies close to create the dimple 14. The pressure pad 54 retreats in the course of this forming operation under the pressure of the upper die 58 to cause the sheet metal forming the can top to be offset and drawn over the nose 52 of the lower die 50.

It is important that adequate clearance be provided to avoid squeezing or trapping the metal and for this reason the shoulder of the lower die 50 is rounded as shown. It is also important that the pressure exerted by the pressure pad 54 under the force of the springs 56 be relatively light pressure that freely permits the sheet metal to creep radially inwardly from the annular region of the pressure pad into the region of the nose 52 of the lower male die 50. In this instance the pressure pad 54 is relieved or slightly cut back in an annular region indicated by the brackets 57 to minimize resistance to slippage of the sheet material. Under some conditions, no pressure pads are necessary. In any event, the metal creeps radially inwardly to the lower die 50 with minimum stretching and thinning of the sheet metal as the lower die offsets the sheet metal into the cavity of the upper die.

Figure 7:
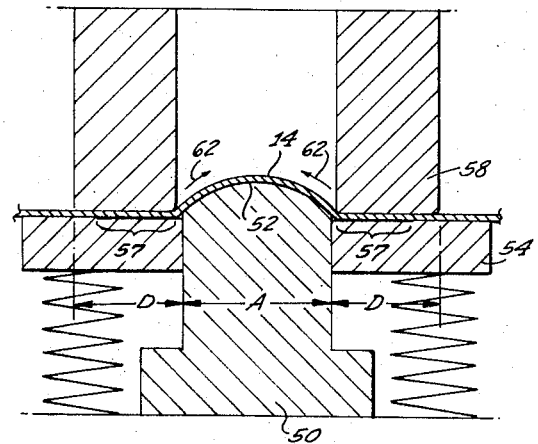
FIGURE 7 is a somewhat diagrammatic sectional view of die means for forming the dimple shown in FIGURE 2.
Figure 8:
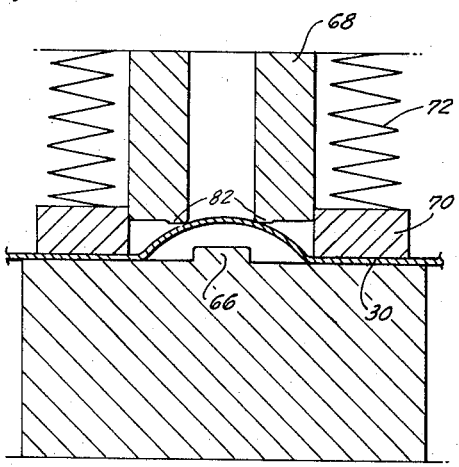
FIGURE 8 is a similar view showing die means for converting the dimple into the desired hat-shaped configuration and to thin the can top at the periphery of the base of the hat-shaped configuration, the die means being shown in position to start the forming operation.
Figure 9:
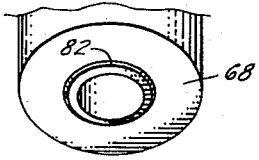
FIGURE 9 is a perspective view of the bottom of the die means shown in FIGURE 8 showing the means to thin the can top at the base of the hat-shaped configuration.

The freedom for slippage of the sheet metal into the zone of the dimple 14 minimizes the thinning of the sheet metal of the dimple and does so at the expense of thinning the metal in the outlying annular region of the female die 58. In FIGURE 7 the area in plan of the dimple 14, i.e., the cross-sectional area of the lower male die 50 is designated A and the surrounding area in the region of the female die 58 is designated D. The arrows 60 and 62 represent this radially inward displacement of the sheet metal from the annular region D into the region A of the dimple 14.

The second stage of converting the dimple 14 into a hat-shaped configuration of substantially smaller surface area is carried out by die means in the manner illustrated by FIGURES 8 to 13. In these figures, a lower die block 64 is formed with a projection 66 of the desired inside configuration of the unstaked hollow rivet.

The complementary upper die means includes an annular female die 68 surrounded by an upper pressure pad 70 which has cooperating pressure springs 72. It is important to note that for this second stage in the forming of the sheet metal, the springs 72 are strong enough to cause the pressure pad 70 to clamp the sheet metal of the can top 32 against the lower die block 64 in a positive manner that prevents any slippage of the sheet metal radially outwardly from the zone of the dimple. It is also important to note that the inside diameter of the upper female die 68 is sufficiently larger than the diameter of the die projection 66 to provide ample clearance for the sheet metal around the periphery of the projection and thus avoid any tendency to draw the sheet metal as it is formed around the periphery of the die projection.

As the upper and lower dies close together, the sheet metal of the dimple 14 behaves in the manner shown in FIGURES 8 to 13, inclusive. As indicated in FIGURE 13, the previously mentioned area A of the dimple 14 is converted into a hat-shaped configuration in which the area in plan of the crown portion of the hat-shaped configuration, i.e., the area in plan of the unstaked rivet 16 is designated B, and the surrounding annular flat or brim portion of the hat-shaped configuration is designated C, these two areas in plan being equal to the plan area A of the dimple 14 that is converted into the hat-shaped configuration.

It is to be especially noted that while the plan areas of the dimple and the hat-shaped configuration are equal, the surface area of the hat-shaped configuration is, in this instance, substantially less than the surface area of the dimple 14 with the consequence that the sheet metal is crowded edgewise in the course of the conversion with consequent thickening of the sheet metal that ultimately assumes the hat-shaped configuration.

Figure 10:
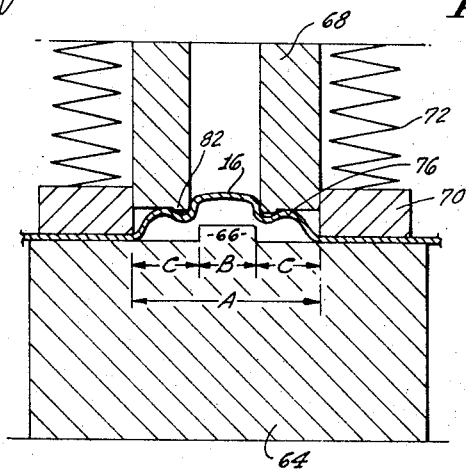

A feature of the invention is that because of the initial configuration of the dimple and because of the configuration of the die means in FIGURES 8 to 13, the thickening of the sheet metal occurs in a selective manner to favor thickening of the sheet metal in the particular regions where thickening is most desirable to eliminate the possibility of fracture of the metal. In the initial deformation of the dimple shown in FIGURES 10 and 11, the dimple is deformed with a ripple effect as the metal presented by the large dimple is forced downwardly and inwardly by the female die 68 as it is urged against the dimple. Thus, as shown in FIGURE 10, the excess metal of the dimple at this stage provides an annular shoulder or ripple 76 outside of the circumference of the die projection 66 in the annular zone C.

Figure 11:
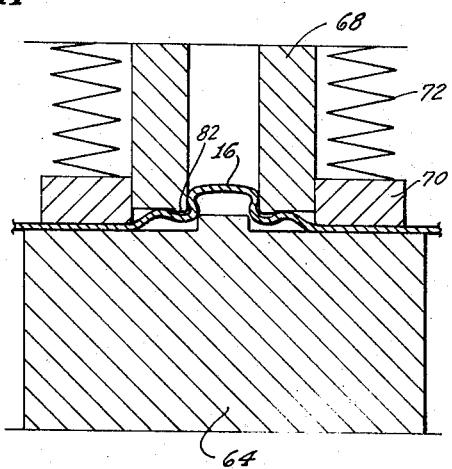

FIGURES 11 and 12 show progressive flattening of the annular ripple 76 by the female die 68, and FIGURE 13 shows the annular ripple completely flattened and the hollow rivet completely formed.

Since the sheet metal in the outer annular zone D is immobilized by the heavy pressure of the pressure pad 70, the displacement of the excess metal producing the annular ripple 76 is desirably radially inwardly toward the die projection 66 to increase the thickness of the metal of the peripheral and transverse walls of the rivet, the annular clearance between the upper female die 68 and the lower die projection 66 being ample to permit this desired thickening effect. This crowding effect on the sheet metal in opposite radial directions as the dimple 14 is converted into the hat-shaped configuration is indicated by the opposed pairs of arrows 78 and 80 shown in dotted lines in FIGURE 13.

As has been previously explained, the metal urged into the cavity of the die 68 is not confined by any die surface other than the wall elements which shape and size the peripheral wall of the hollow rivet. No die surface is present in the tooling which limits the upward movement of the metal into the cavity of the female die and consequently the metal which forms the transverse or end wall of the rivet is free to move without restraint to its ultimate or final position. This permits, as should now be fully understood, a maximum thickening of the transverse end wall of the hollow rivet 16.

The upper female die 68 is provided with an annular ridge or extension 82 which effectively squeezes the sheet metal in a zone 84 around the base of the hollow rivet to reduce the thickness of the metal in this circumferential area. The annular ridge 82 is more clearly illustrated in FIGURE 9 and the thinned zone 84 is more clearly illustrated in cross section in FIGURE 14. The thinning of the metal adjacent the base of the rivet by the die ridge 82 causes the metal to extrude into the wall of the hollow rivet to not only thicken the wall, but also to extend the height or axial dimension of the hollow rivet. Although the sheet metal is thinned in the zone 84, the sheet metal is work hardened and the local strength of the sheet metal is not materially reduced, and the same will withstand pressure within the container. The thinning of the metal in the zone 84 also facilitates reducing the thickness of the metal still further by the subsequent scoring operation to form the tear strip 18 and thus leave an exceedingly thin residual web along the score line. It has been found that attempts to reduce the metal to the desired thickness along the score line by a scoring operation alone causes the residual web of metal at the score line to be excessively work hardened and to tear or break because of the high tension stresses induced by the coining or scoring operation, thus destroying the use of the sheet metal for a can top. On the other hand, it has been found that if a preliminary step is taken of locally thinning the sheet metal before the scoring operation, the metal may be safely reduced to an exceedingly thin residual web along the score line. For example, aluminum alloy of approximately .015" thickness may be reduced to a thickness of .009" locally before a scoring operation and then may be still further reduced by a scoring operation to a thin residual web of a thickness of .003", but to attempt to reduce the sheet metal from .015" to .003" in one operation would tend to cause the metal to rupture or form incipient cracks resulting in leakage paths when the can is placed in use. On the other hand, forcibly thinning the metal locally before the scoring operation not only makes possible deep scoring but also stiffens the metal adjacent the tear strip by work hardening and the increased resistance to bending of the metal adjacent the tear strip facilitates the tearing of the metal along the score line.

In the embodiment illustrated, the scoring operation along the score line 38 that defines the tear strip 18 enters the thin zone 84 and is looped in close proximity to the base of the unstaked rivet 16 to leave an exceedingly thin residual web of metal in the zone to form the leading end of the tear strip where the tab functions to tear the metal to initiate the opening of the can.

It is apparent that the initial lifting force of the tab is concentrated in the region of the rivet and the fact that the score line is very close to the rivet and the further fact that the metal is locally thinned before the scoring operation in this region are both conducive to initiation of the tearing action by relatively little prying force.

FIGURES 15, 16 and 17 together with corresponding FIGURES 18, 19 and 20 illustrate the operation of scoring the can top 32 to produce the score line 38 after the sheet metal of the can top has been thinned in the zone 84 around the base of the rivet, which zone is best shown in FIGURES 3 and 6. FIGURE 15 shows the upper scoring die poised for operation; FIGURE 16 shows the upper scoring die at the end of its operating stroke and FIGURE 17 shows the scoring completed with the scoring die retracted, the three figures being taken along the line 17—17 of FIGURE 6.

FIGURES 15, 16 and 17 show a scoring element 130 of an upper scoring die 132 and also show a lower anvil 134 which cooperates with the upper die and which has a boss 135 dimensioned to telescope into the hollow rivet 16 of a can top to position the can top accurately relative to the upper scoring die 132. It is to be noted that the lower anvil 134 is formed with a plateau 136 which is dimensioned and located to contact the can top in the region of the zone 84 around the base of the hollow rivet where the sheet material has been thinned as previously described with reference to FIGURES 13 and 14. FIGURE 23 shows the two dies 132 and 134.

It has been found that when the scoring element 130 penetrates the thinned sheet metal in the zone 84 around the hollow rivet there is a certain spreading action on the thinned sheet metal that is especially pronounced during the last half of the penetration of the scoring element. As a result there is a tendency for the sheet metal to be displaced towards the rivet with consequent deformation of the sheet metal adjacent the base of the rivet. A feature of the fabrication procedure illustrated by FIGURES 15 to 17 is that the scoring die is constructed to prevent such distortion or deformation of the sheet material.

For this purpose the upper scoring die 132 is formed with a circular land 138 which is shown in perspective in FIGURE 23 and is shown in enlarged section in FIGURES 15, 16 and 17. It may be seen in FIGURES 15, 16 and 17 that the land 138 is dimensioned to enter the zone 84 around the base of the rivet and it may be further seen that the upper die 132 snugly encircles the hollow rivet 16.

As the scoring element 130 approaches the point of maximum penetration of the sheet material of the can top, the land 138 approaches closely to the thinned sheet material in the zone 84 as indicated in FIGURE 16 but does not quite contact the sheet metal. It may be seen in FIGURE 16 that when the scoring tool is at the end of its scoring stroke both the circumferential wall of the rivet and the thinned sheet material in the zone 84 at the base of the rivet are confined and closely controlled by the two dies 132 and 134 to prevent deformation of the sheet material by the scoring operation.

The leading edge of the scoring element 130 throughout the entire length of the scoring element is in a plane that is perpendicular to the direction of movement of the scoring dies and perpendicular to the plane of the can top that is operated on by the scoring dies. As shown in FIGURE 23, the plateau 136 which is elevated slightly above the face of the lower anvil 134 is formed with a slope 142 that extends from the surface of the plateau to the die face 140. It may be seen in FIGURE 23 that the slope 142 is in the region where two spaced coextensive portions of the scoring element 130 of the upper die 132 lead away from the land 138 of the upper die and are positioned relative to the lower die 134 to extend down the slope 142.

FIGURES 18, 19 and 20 which show a section along the line of the scoring in the region indicated by the arrow 20 in FIGURE 6 show in section a portion of the plateau 136 and the slope 142 that leads downward from the plateau to the face 140 of the lower die 134. FIGURES 18, 19 and 20 further show the scoring element 130 in this same region.

FIGURE 18 corresponds to FIGURE 15 and shows the scoring element 130 poised in preparation for scoring the metal in the region of the slope 142 of the plateau 136. It is to be noted in FIGURE 18 that the can top 32 rests on the plateau 136 and is spaced from the lower die face 40 by the height of the plateau.

FIGURE 19 shows the position of the scoring element 130 at the point of maximum advance of the scoring element into the sheet material of the can top 32. It may be noted in FIGURE 19 that the sheet material of the can top 32 retreats from the advancing scoring element 130 and therefore the sheet material of the can top lies against the slope 142 and also lies against the die face 140 at the point of maximum penetration of the scoring element. It is apparent in FIGURE 19 that in the zone 84 adjacent the top of the plateau 136 where the can top is thinned around the base of the hollow rivet, the scoring element 130 penetrates the thinned sheet material uniformly to leave a residual web of metal 144 that is very thin.

As heretofore stated, the initial thickness of the can top 32 may be, for example .015″ and the sheet metal in the zone 84 may be thinned to a thickness of .009″ and the residual web 144 in the thinned zone after scoring may be approximately .003″. At the upper end of the slope 132 where the sheet metal of the can top can retreat only slightly from the advancing scoring tool, the scoring element 130 penetrates the sheet material relatively deeply but the penetration is progressively less along the slope 142 away from the plateau 136. In the region of the face 140 on the right side of FIGURE 19, the sheet metal of the can top 32 retreats to such extent that the penetration of the scoring element 130 into the sheet material is .009″ leaving a residual web of .006″ for the remainder of the scoring.

FIGURE 20 shows how the sheet metal of the can top 32 springs back after the scoring operation. The advantage of this procedure is that the upper scoring die 130 may be formed with high precision at relatively low cost since the leading edge of the scoring element 130 lies in a plane. It would be expensive to make a highly accurate scoring die in which the leading edge of the scoring element 130 would conform accurately to cross-sectional configuration of the sheet metal with penetration to uniform depth in the thin zone 84 and outside the zone where the sheet metal is of full thickness.

After the hollow unstaked rivet 16 is formed and the metal of the can top is scored along the line 38, the tab 26 is placed at its assembled position with the unstaked hollow rivet 16 extending through the aperture 24 of the tab 26 as shown in FIGURE 21, and then the rivet is deformed to its staked configuration in positive engagement with the tab, the staking operation being shown in FIGURES 21 and 22. In this staking operation, the tab 26 and the metal of the can top outside the diameter of the rivet 16 are clamped between an upper pressure pad 90 acted upon by upper springs 92 and a lower pressure pad 94 acted upon by lower springs 96, the springs being relatively heavy springs. The lower pressure pad 94 surrounds a male die or anvil 98 which is dimensioned to telescope into the interior of the hollow rivet 16 and is adapted to cooperate with an upper impact die 100 of substantially the same diameter.

As the two dies 98 and 100 start to close, they are in the position shown in FIGURE 21 with the anvil 98 supporting the walls of the rivet and with the impact die 100 abutting the upper surface of the end wall. It should be noted that the lower die member 98 as it does support the peripheral wall of the rivet, will act as a mandrel to hold the wall against buckling and inward collapse as the dies 98 and 100 close in the final rivet forming operation. Further, the anvil 98 and the wall of the aperture 24 of the tab closely confine the peripheral wall of the rivet and thus act to prevent flow of the metal of the peripheral wall axially of the rivet into the can end under the compression force induced into the rivet as the die members 98 and 100 close. Thus the anvil 98 acts to make available as much metal as possible at the free end of the rivet to form the interlocking bead 44. As the two dies 98 and 100 close, the closing action should be with sufficient impact force preferably to extrude the metal of the end wall radially outward to form the bead 44 to the final configuration shown in FIGURE 5 for effective position engagement with the tab 26.

This final radial displacement of the metal of the end wall of the rivet by extrusion of the end wall metal is indicated by the arrows 102 shown in solid lines in FIGURE 22. It is apparent in FIGURE 5 that the end wall 108 of the staked rivet 30 is substantially thinner than the rest of the rivet and is much thinner than the thickness of the sheet metal stock from which the can top is fabricated. It also can be seen that the thickness of the wall of the staked rivet 30 progressively increases from the region of the end wall through the bead and into the peripheral wall of the rivet.

It is to be particularly noted that the final staking operation which results in the configuration shown in FIGURE 5 does not shorten the peripheral wall of the rivet nor crush the peripheral wall as would occur if the whole rivet were compressed axially in the usual manner.

Preferably the two edges 110 and 112 of the rim of the aperture 24 are chamfered or rounded to a radius. For this purpose, the aperture 24 may be processed by coining dies to produce the rounded edges, preferably at a radius of 0.005 inch. The rounding of the edges eliminates any tendency for the rim to cut or damage the metal of the hollow rivet in the staking operation.

It is also to be noted that when the rivet is staked, the thickness of the end wall of the rivet may be on the order of 30 to 50 percent of the original gauge thickness. As heretofore stated, the relatively thin web of metal that forms the rivet top is of adequate strength to withstand the internal pressure of the usual container with a large safety factor because the diameter of this web is relatively small.

The impact force, as should now be understood, is utilized to induce radially outward metal flow creating the circumscribing lead 44 overlying the edge portion of the tab aperture 24. In the final staked configuration of the rivet, the hollow bead 44 has an inner radius which spaces the transverse end wall 108 of the rivet from the cylindrical peripheral wall of the rivet. In the preferred practice of the invention, the transverse wall 108 of the rivet should not be thinned to an extent greater than the thinning incident to the formation of the score lines 38 in the can top earlier described.

FIGURE 5 is illustrative of a typical optimum quality staked rivet configuration, and it will be noted that the thickness of the outwardly directed circumscribing bead 44 as measured radially of the rivet is at least as thick as the cylindrical peripheral wall of the rivet.

In FIGURES 18 and 19 the upper pressure pad 90 is cut away to provide an annular space 114 into which the metal may be displaced freely in the staking operation. In these figures, the annular space 114 is relatively large and does not limit the radial displacement of the metal in the staking operation.

It is important to note in FIGURE 22 that the two opposed dies compress the end wall of the hollow rivet across the thickness of the end wall in an area which is limited to the area of the inside surface of the end wall of the unstaked rivet. It is also important to note that the staking operation is carried out in a plane that is spaced substantially outward from the plane of the tab and is the plane of the end wall of the hollow rivet before the rivet is staked. Thus, in FIGURE 21, the upper working face of the lower die 98 is in a plane spaced substantially from the outer face of the tab, this plane being the plane of the inner surface of the end wall of the unstaked rivet. It is apparent that the staking operation is carried out without subjecting the cylindrical peripheral wall of the hollow rivet to destructive axial compression.

In different practices of the invention, the tear strip may be formed as shown in FIGURE 4 or may be formed as shown in FIGURE 24. In FIGURE 4, as explained previously, the tear strip 18 has a spiral-like configuration extending around the circumference of the can top so that removal of the tear strip severs substantially the entire can top from the can. The tear strip 119 shown in FIGURE 20, on the other hand, leaves an opening in the can to serve as a pouring spout with an air admitting area 120 formed centrally of the can where the score lines are spaced a slight distance apart and with a pouring area 122 adjacent the periphery of the can top where the score lines diverge to form a substantially triangular area. The tab 124 in FIGURE 20 is joined to this tear strip 119 in the manner heretofore described.

FIGURE 25 shows how a scoring element of a scoring die, in this instance the previously mentioned scoring element 130 of the scoring die 132, may be "stoned" or lightly abraded to form a rounded longitudinal edge 145, the opposite longitudinal edge 146 remaining relatively sharp. When the scoring element 130 penetrates the sheet metal of a can top, for example when it penetrates the relatively thin metal in the zone 84 to leave a groove that is indicated by numeral 148 in FIGURE 23, one side edge of the groove at the bottom of the groove is formed with a strengthening fillet 150 while at the other side of the groove the side wall of the groove and the bottom wall of the groove meet at a relatively sharp angle.

When a line of scoring is formed by a groove 148, it is found that the line of least resistance for the tearing action does not shift at random from one side of the groove to the other, but instead follows the edge of the bottom of the groove that is opposite from the fillet 150. Thus the thin residual web of metal 152 that is formed by the scoring element 130 tears along the dotted line 154. It is to be noted that the dotted line 154 is on the side of the residual web 152 that is away from the tear strip 18 and consequently the residual web 152 is carried away by the tear strip. As a consequence the opening formed in the can top by the removal of the tear strip has a rim that is relatively smooth instead of a rim that is sharp and jagged.

FIGURES 27 and 28 illustrate how die means may be employed to form a flange around an aperture 154 in a sheet metal tab 155. The upper die 156 shown in FIGURES 24 and 25 has a smooth rounded nose 158 that is larger in diameter than the aperture 154 and the lower die 160 in FIGURE 24 has a circular cavity 162 that provides sufficient clearance around the die 156 to permit the formation of a continuous flange 164 which forms a hub projecting from the plane of the tab. When the two dies 156 and 160 operate the rounded nose 158 of the upper die 156 makes initial contact with the sharp edge 165 of the aperture 154 and blunts or rounds this edge. As a consequence the inner edge 165a of the flange or hub 164 is desirably rounded as indicated in FIGURE 28.

FIGURE 29 shows how the tab 155 may embrace a staked hollow rivet 30 and be positively engaged by the staked hollow rivet with the flange or hub 164 of the tab in abutment with the sheet metal of the can top in the thin zone 84 at the base of the hollow rivet. The score line in FIGURE 29 is the previously described groove 148 which is formed with a fillet 150 on the side adjacent the tear strip. Preferably the groove 148 that forms the score line is so close to the staked rivet that the hub 164 of the tab 155 overhangs the groove as shown. It has been found that this arrangement is advantageous in that it results in high magnitude shearing stresses at the score line when the tab 155 is manipulated to lift the rivet 30 for initiating severance of the leading end of the tear strip.

FIGURE 30 shows how the tab 155 may be formed with a circular offset 166 concentric to the flange or hub 164 and further shows how the tab may be assembled on the can top with the hub or flange 164 extending upward into abutment with the bead 44 of the staked rivet 30. It will be noted that the circular offset 166 enables the tab 155 to seat in the zone 84 in FIGURE 30. It is also to be noted in FIGURE 30 that the inner rounded edge 165a of the flange 164 conforms to the curvature of the staked rivet 30 at the base of the bead 44. Thus the rounded edge 165a lacks the tendency of a sharp edge to gouge and damage the staked hollow rivet that is embraced by the tab.

It is apparent that forming a tab with a hub is important in the final product because the hub not only strengths the tab itself but also reinforces the hollow rivet that it embraces. As a result the joint that is so formed in this manner between a tab and a tear strip has exceptional strength and there is no tendency whatsoever for the aperture of the tab to stretch or elongate to release the hollow rivet when the tab is manipulated to severance of the tear strip.

As heretofore stated, in a beer can in which the cylindrical body and bottom wall of the can are made of tin-coated steel and the can top is made of aluminum with a sealant coat on the inner surface of the aluminum, there is a tendency for iron to dissolve into the beer to an extent to impair the taste. If, however, the sealant coat on the inner surface of the aluminum can top is ruptured to expose an exceedingly small area of the aluminum to the beer, the extent to which iron dissolves into the beer is greatly reduced and the flavor is not noticeably impaired.

FIGURE 26 shows how the sealant coat 170 on the inner side of the aluminum can top is ruptured by the scoring of the can top to form the tear strip. When the scoring element 130 penetrates the sheet metal it functions with a wedging action that spreads the metal in opposite directions as indicated by the arrows in FIGURE 26. Consequently the sealing coat 170 is shifted in opposite directions to form a rupture or gap in the sealant coat whereby the aluminum alloy of the can top is directly exposed to the contents of the can. In the preferred practice of the invention the operation for forming and staking the hollow rivet also disrupts the sealant coat to expose minute areas of aluminum to the liquid content of the can.

The various practices of the invention have been illustrated and described with the can tops in upright position in the dies, i.e. with the hollow rivets protruding upward. In actual production, however, the can tops may be fabricated in reversed position, i.e. with the hollow rivets protruding downward.

My description in specific detail of the selected practices of the invention will suggest to those skilled in the art, various changes, substitutions and other departures from my disclosure within the spirit and scope of the appended claims.

I claim:

1. A method of fabricating can tops having tear strips with tabs attached thereto for manual removal of the tear strips, characterized by the steps of:
   advancing a sheet of deformable material step by step through a series of work stations including a succession of forming stations and a final shearing station;
   forming can tops in said sheet at one of said forming stations without severing the can tops from the sheet;
   forming dimples in the can tops at one of said forming stations;
   at a subsequent forming station forcibly converting the dimples into hollow rivets with transverse end walls of lesser area than the dimples;
   scoring the can tops to form tear strips therein at one of said forming stations;
   placing apertured tabs on the formed hollow rivets and deforming the hollow rivets into permanent engagement with the tabs at another of the forming stations; and
   severing the can tops with the tabs thereon from the sheet at the final shearing station.

2. A method of fabricating can tops having tear strips with tabs attached thereto, characterized by the steps of:
   advancing a sheet of deformable material step by step through a series of work stations;
   forming can tops in said sheet at one of said stations without severing the can tops from the sheet;
   scoring the can tops to form tear strips therein at one of said stations;
   attaching tabs to the tear strips at a subsequent station; and
   severing the can tops with the tabs thereon from the sheet at a final station.

3. A method of fabricating can tops having tear strips with tabs attached thereto for manual removal of the tear strips, characterized by the steps of:
   forming dimples in the can tops;
   forcibly converting the dimples into hollow rivets with transverse end walls of lesser area than the dimples between die surfaces of coacting die members which also squeeze areas of the material of the can tops at the bases of the hollow rivets;
   scoring the can tops including the squeezed areas to form tear strips therein; and
   placing apertured tabs on the formed hollow rivets and deforming the hollow rivets into permanent engagement with the tabs.

4. In a method of fabricating a can top having a tear strip with a hollow rivet formed in the tear strip and a tab of sheet material attached to the tear strip by the hollow rivet extending through an aperture in the tab with a circumferential bead of the hollow rivet engaging the tab, the improvement to reinforce both the rivet and the tab and to strengthen the joint therebetween, comprising:
   forming an aperture in the tab of smaller area than the cross section of the hollow rivets; and
   forcing a tool with a smooth rounded nose of larger diameter than the aperture into the aperture to increase the area of the aperture to approximately cross-sectional area of the hollow rivet and to form a flange around the aperture and to round the edge of the flange.

5. A method of fabricating a can top of deformable sheet material, the can top having a tear strip with a tab of sheet material attached thereto, characterized by the steps of:
   offsetting the sheet material from the area of the desired tear strip to form a hollow rivet;
   scoring the sheet material to define the tear strip with the hollow rivet in the tear strip;
   forming an aperture in a tab of sheet material;
   forming a continuous flange around the aperture of the tab to provide a hub dimensioned to telescope over the hollow rivet;

placing the tab on the can top with the hollow rivet extending through the hub; and expanding the hollow rivet to form a circumferential bead thereon in permanent engagement with the hub.

6. A method as set forth in claim 5 in which the edge of the flange is positioned for abutment with the bead of the hollow rivet.

7. A method as set forth in claim 5 in which the edge of the flange is positioned in abutment with the tear strip at the base of the hollow rivet.

8. A method of fabricating a can top of deformable sheet material, the can top having a tear strip with a tab of sheet material attached thereto, characterized by the steps of:

offsetting the sheet material in the area of the tear strip to form the hollow rivet to an initial configuration;

subsequently squeezing the sheet material across its thickness in a zone surrounding the base of the rivet to extrude the sheet material radially inward into the hollow rivet to increase the axial dimension of the hollow rivet;

scoring the sheet material to form the tear strip with the scoring enclosing the hollow rivet and extending into said zone;

forming an aperture in the tab and flanging the rim of the aperture to form a hub dimensioned to telescope over the hollow rivet;

placing the tab on the can top with the hollow rivet extending through the hub of the tab and with the rim of the hub abutting the tear strip in said zone; and expanding the hollow rivet to form a circumferential bead thereon in permanent engagement with the hub.

9. A method of fabricating an easy opening container of the character described wherein a sheet metal wall of the container is scored to form a tear strip and a tab is attached to the tear strip by a hollow rivet formed in the tear strip, said method being characterized by the steps of:

squeezing the sheet metal wall around the base of the rivet to form a zone in which the wall is reduced in thickness;

placing one face of the sheet metal wall against a first die having a plateau conforming to said zone and having an extensive planar working face at the base of the plateau with a slope leading from the top of the plateau to said working face;

positioning a second die against the other face of the sheet metal wall, the second die having a protruding scoring element to score the wall of the container to form the tear strip, said scoring element having a leading edge in a plane parallel to said working face, said scoring element being of a configuration to loop around the hollow rivet in the region of said zone with two spaced coextensive portions of the scoring element positioned to extend over the plateau, down said slope and along said working face; and causing relative movement of said dies to force said scoring element into the material of the sheet metal wall with consequent deflection of the sheet metal wall against said slope and against said working face to cause the scoring element to form a relatively thin residual web in said zone and to form a substantially thicker residual web outside of said zone.

10. A method as set forth in claim 9 in which said second die is dimensioned to confine the hollow rivet and has a land corresponding to said zone, the land being dimensioned to approach in close proximity to the surface of the sheet metal wall in said zone when the scoring element makes maximum penetration of the sheet metal wall.

11. A method of fabricating an easy opening container of the character described wherein a sheet metal wall of the container is scored to form a tear strip and a tab is attached to the tear strip by a hollow rivet formed in the tear strip, said method being characterized by the steps of:

squeezing the container wall around the base of the rivet to form a zone in which the container wall is reduced in thickness and to displace material of the container wall towards the rivet to add axial dimension to the rivet; and scoring the container wall in a region including said zone while confining the rivet circumferentially and confining the material of the container wall in said zone to prevent distortion of the rivet and the container wall by the scoring operation.

12. A method of fabricating a can top of deformable sheet material, characterized by the steps of:

forming a dimple in the sheet material;

progressively converting the dimple by stages into a hollow rivet of lesser area than the dimple including a final stage wherein a male die conforming to the desired internal configuration of the hollow rivet shapes the sheet material of the dimple in a die cavity conforming to the desired external configuration of the hollow rivet;

with adequate clearance between the male die and the die cavity in said final stage to avoid any substantial thinning of the sheet material that forms the peripheral wall of the hollow rivet;

scoring the sheet material along a line to form a tear strip with the line of scoring extending around approximately half of the periphery of the hollow rivet to position the hollow rivet at the leading end of the tear strip;

positioning a tab with an aperture therein on the sheet material with the hollow rivet extending through the aperture and with the tab embracing the portion of the peripheral wall of the hollow rivet that is adjacent the base of the hollow rivet;

clamping the tab and the sheet material surrounding the base of the hollow rivet between a first annular pressure means surrounding the hollow rivet and a second pressure means abutting the sheet material in an area surrounding the base of the hollow rivet with the first annular pressure means oversized relative to the hollow rivet to provide an annular space for radial expansion of the hollow rivet;

inserting a mandrel into the interior of the hollow rivet to cooperate with the clamped tab to confine and support the portion of the peripheral wall of the hollow rivet that is adjacent the base of the rivet; and while the tab and sheet material are clamped together, moving an impact member against the outer end of the hollow rivet to deform the hollow rivet by expanding the free end portion thereof into said annular space to form a bead on the hollow rivet in overlapping engagement with the rim of the aperture of the tab.

13. In a method of fabricating an easy opening can top of deformable sheet material, the steps of:

forming a dimple in the sheet material;

reshaping the dimple to form a hollow rivet having a transverse end wall of substantially lesser area than the area of said dimple and simultaneously compressing the sheet material across its thickness in an annular zone adjacent the base of the hollow rivet to thin the sheet material locally and to extrude material radially inward into the hollow rivet to increase the axial dimension of the hollow rivet;

forming a line of weakness adjacent the rivet to define a tear strip in the can top;

positioning a tab over said hollow rivet; and deforming the hollow rivet to secure the tab to the sheet material whereby manipulation of said tab ruptures the sheet material along the line of weakness.

14. In a method of converting a can end into an easy-open can end having a segment at least partially manually removable therefrom without the aid of a tool, the steps of:

providing a can end of sheet material having a peripheral portion attachable to a container and having a dimple protruding from the plane of the can end;

supporting the can end;

moving a first die member having a working face with a recess therein into engagement with a peripheral portion of the exterior surface of said dimple;

forceably continuing the movement of said first die member to convert a central segment of the dimple into a steep sided hollow rivet having a transverse end wall and a peripheral wall and to convert an outer radial region of the dimple into a portion of the can end surrounding and supporting said hollow rivet;

forming a line of weakness adjacent said rivet to define a tear strip and thereby provide a segment of the can end at least partially removable therefrom;

providing a tab having an aperture sized to fit over said hollow rivet;

positioning said tab on said rivet with the rivet extending through said aperture;

inserting a male die into the hollow rivet to prevent substantial inward collapse of said peripheral wall of said rivet near the base of the rivet; and with the male die inserted into the hollow rivet, heading the hollow rivet to secure the tab to the can end whereby manipulation of the tab ruptures the line of weakness to at least partially remove the segment defined by said tear strip from the can end.

15. In a method of converting a can end into an easy-open can end having a segment at least partially manually removable therefrom without the aid of a tool, the steps of:

providing a can end of sheet material of no greater than approximately a .015 inch thickness and having a peripheral portion attachable to a container;

offsetting the can end to form a dimple having a sloping wall protruding from the plane of the can end;

supporting the can end;

moving a first die member having a working face with a recess therein into engagement with a peripheral portion of the exterior of said dimple;

forceably continuing the movement of said first die member to convert a central segment of the dimple to a steep sided hollow rivet having a transverse end wall and a peripheral wall and to convert an outer radial region of the dimple into a portion of the can end surrounding and supporting said hollow rivet;

forming a line of weakness adjacent said rivet to define a tear strip and thereby providing a segment of the can end at least partially rupturable therefrom, said rivet lying within the area of said tear strip;

providing a tab having an aperture sized to fit over said rivet;

positioning said tab on said rivet with the rivet extending through said aperture;

inserting a male die into the hollow rivet to prevent complete inward collapse of said peripheral wall of said rivet near the base of the hollow rivet; and with the male die inserted into the hollow rivet, heading the hollow rivet to secure the tab to the tear strip whereby manipulation of the tab ruptures the line of weakness to thereby at least partially remove the segment defined by said tear strip from the can end.

16. In a method of converting a can end into an easy-open can end having a segment manually removable therefrom without the aid of a tool, the steps of:

providing a can end of sheet material having a peripheral portion attachable to a container;

offsetting the can end to form a dimple having a gradually sloping wall protruding from the plane of the can end;

supporting the can end;

inserting a male die member into the dimple;

forcing a second die member having a generally annular working face into engagement with a generally annular peripheral portion of the exterior of said dimple to fold the sheet metal inwardly in a generally annular zone of the dimple, to substantially flatten a circumferential peripheral zone of the dimple and to convert a central segment of the dimple into a hollow rivet;

scoring the can end around said rivet to provide a preselected line of weakness defining a tear strip and thereby providing a segment of the can end removable therefrom, said rivet lying within the area of said tear strip;

providing a tab having an aperture sized to telescope over said rivet;

positioning said tab on said rivet with the rivet extending through said aperture;

inserting a male member into said rivet to prevent substantial inward collapse of the peripheral wall of the rivet adjacent the base of the rivet; and striking the transverse end wall of the rivet to expand the latter radially until it is larger than the area of said aperture to firmly secure said tab to said tear strip whereby manipulation of the tab ruptures the line of weakness to thereby remove the segment defined by said tear strip from the can end.

17. A method as defined in claim 16 wherein said step of scoring is carried out subsequent to formation of the dimple and prior to the step of striking.

18. A method of converting a can end into an easy-open can end having a segment manually removable therefrom without the aid of a tool, the steps of:

providing a can end of sheet material having a peripheral portion attachable to a container;

offsetting the can end to form a dimple of lesser thickness than the remaining portion of said can end and having a sloping wall protruding from the plane of the can end;

supporting the can end;

positioning a first die member having a working face with a recess therein generally in alignment with the said dimple on the side of the can end from which said dimple protrudes;

positioning another die member generally in alignment with said dimple on the other side of said dimple; forceably moving said die members toward each other to reshape said dimple to form a hollow rivet having a transverse end wall of lesser area than the area of said dimple and a peripheral wall extending outwardly from the plane of the can end to simultaneously compress an annular peripheral portion of the dimple to thin the sheet material adjacent said annular peripheral portion, and to extrude material radially inward into the hollow rivet to increase the wall thickness thereof;

scoring the can end around said rivet to provide a preselected line of weakness forming a tear strip and thereby providing a segment of the can end removable therefrom;

providing a tab having an aperture sized to fit over said hollow rivet;

positioning said tab over said rivet with the rivet extending through said aperture; and deforming said rivet to rigidly secure said tab to said tear strip while preventing substantial inward collapse of the peripheral wall of said rivet adjacent the base of the rivet whereby manipulation of the tab ruptures the line of weakness to thereby remove the segment defined by said tear strip from the can end.

19. In a method of fabricating a can top from sheet metal, the combination of:
   forming a dimple in the sheet material having a sloping wall protruding from the plane of the sheet material;
   forceably converting the dimple into a hollow rivet having a transverse end wall of lesser area than the dimple and a peripheral wall utilizing coacting die members;
   substantially simultaneously with said step of converting deforming a region of the sheet material adjacent the base of the rivet with said die members to cause at least some of the material of said region to flow into at least one of said walls of the rivet;
   scoring the can top around said rivet to provide a preselected line of weakness forming a tear strip;
   placing a tab on the rivet; and
   deforming the hollow rivet into permanent engagement with the tab to thereby secure the tab to the can top.

20. A method as defined in claim 15 wherein said step of heading includes extruding the material of said transverse end wall of said hollow rivet radially outwardly.

21. A method of making an easy open can end having a segment manually removable therefrom without the use of a tool including the steps of:
   providing a section of sheet material;
   forming a hollow rivet in said section of sheet material, said hollow rivet having a transverse end wall and an outwardly extending peripheral wall;
   forming a line of weakness in said sheet material adjacent said rivet to define a tear strip at least partially rupturable from said section of said sheet material;
   providing a tab having an aperture therein;
   placing said tab on said hollow rivet with the rivet protruding through the aperture in the tab;
   inserting a staking punch into said hollow rivet; and
   striking the outer surface of the transverse end wall of said hollow rivet to expand said hollow rivet and to extrude some of the material of said transverse end wall radially outwardly whereby said rivet holds said tab to said section of sheet material.

22. A method as defined in claim 21 wherein said step of inserting includes inserting said staking punch into said hollow rivet into substantial engagement with the inner surface of said transverse end wall and including the step of maintaining said staking punch in substantial engagement with the inner surface of the transverse end wall during said step of striking.

23. In a method of making an easy-opening container from a section of sheet material, the steps of:
   scoring the sheet material to form a rupturable residual web which defines a tear strip at least partially removable from the sheet material with the residual web being thinner than the adjacent portions of the sheet material and having a first longitudinal edge adjacent the tear strip and a second longitudinal edge remote from the tear strip with the edges of the residual web extending along the junctures of the residual web and said adjacent portions of the sheet material;
   forming a line of minimum resistance to tearing along said second longitudinal edge of said residual web; and
   attaching a tab to said sheet material adjacent said residual web for severing of the residual web to thereby initiate removal of the tear strip from the sheet material, said residual web being severable along said line of minimum resistance whereby said residual web is removable with said tear strip.

24. A method as defined in claim 23 wherein said step of forming includes forming a strengthening fillet along the first longitudinal edge of the residual web and forming a relatively sharp corner along the second longitudinal edge of the residual web between the residual web and said adjacent portions of the sheet material to thereby produce the line of minimum resistance to tearing.

25. In a method of forming an easy-opening container from a section of sheet material, the steps of:
   forcibly engaging the sheet material with a scoring die having a protruding scoring element with a rounded longitudinal edge and a relatively sharp opposite longitudinal edge to form a rupturable residual web of reduced thickness defining a tear strip with the residual web and the adjacent region of the sheet material defining a groove having a strengthening fillet along one bottom longitudinal edge thereof and a relatively sharp corner along the other bottom longitudinal edge thereof to thereby produce a line of minimum resistance to tearing along the last mentioned longitudinal edge of the groove; and
   attaching a tab to the tear strip for severing the residual web to at least partially remove the tear strip from the sheet material, said residual web being severable along the line of minimum resistance whereby said residual web is removable with said tear strip.

References Cited

UNITED STATES PATENTS

| | | | |
|---|---|---|---|
| 1,715,812 | 6/1929 | Bauer | 29—33.8 |
| 2,992,857 | 7/1961 | Lemmerez | 29—523 |
| 3,272,166 | 9/1966 | Henchert | 113—111 |
| 2,544,969 | 3/1951 | Underwood | 113—121 |
| 3,070,058 | 12/1962 | Boyer | 113—121 |
| 3,151,766 | 10/1964 | Henchert | 220—54 |
| 3,191,797 | 6/1965 | Fraze | 220—54 |

CHARLES W. LANHAM, *Primary Examiner.*

THERON E. CONDON, R. D. GREFE, *Examiners.*

G. T. HALL, *Assistant Examiner.*

UNITED STATES PATENT OFFICE
CERTIFICATE OF CORRECTION

Patent No. 3,366,086                  January 30, 1968

Ermal C. Fraze

It is certified that error appears in the above identified patent and that said Letters Patent are hereby corrected as shown below:

Column 19, line 58, "adjacent" should read -- around --.

Signed and sealed this 5th day of January 1971.

(SEAL)
Attest:

Edward M. Fletcher, Jr.               WILLIAM E. SCHUYLER, JR.
Attesting Officer                      Commissioner of Patents